United States Patent [19]
Lukasiewicz et al.

[11] Patent Number: 5,126,617

[45] Date of Patent: Jun. 30, 1992

[54] CYLINDER PRESSURE SENSOR FOR AN INTERNAL COMBUSTION ENGINE

[75] Inventors: Stanley J. Lukasiewicz, Rumford; Charles M. Anastasia, Barrington, both of R.I.; Lawrence E. Cooper; Gregg W. Pestana, both of Attleboro, Mass.

[73] Assignee: Texas Instruments Incorporated, Dallas, Tex.

[21] Appl. No.: 739,590

[22] Filed: Aug. 2, 1991

Related U.S. Application Data

[62] Division of Ser. No. 118,374, Nov. 9, 1987, Pat. No. 5,038,069.

[51] Int. Cl.⁵ ............................................. H01L 41/08
[52] U.S. Cl. ....................................... 310/338; 73/715
[58] Field of Search ................ 310/338, 339, 363–366, 310/358, 359, 346; 73/35, 167, 706, 714, 715, 725, 736, 744, 745, 753, 754, 818, 820, 862.38, 862.68

[56] References Cited

U.S. PATENT DOCUMENTS

| | | | |
|---|---|---|---|
| 4,523,121 | 6/1985 | Takahashi et al. | 310/358 X |
| 4,570,098 | 2/1986 | Tomita et al. | 310/363 X |
| 4,780,639 | 10/1988 | Shirasu | 310/358 X |
| 4,885,498 | 12/1989 | Wakita | 310/366 X |
| 4,928,264 | 5/1990 | Kahn | 310/358 X |
| 5,038,069 | 8/1991 | Lukasiewicz et al. | 310/338 |

FOREIGN PATENT DOCUMENTS

| | | | |
|---|---|---|---|
| 0408306 | 1/1991 | European Pat. Off. | 310/358 |
| 0068687 | 5/1980 | Japan | 310/358 |
| 0170200 | 10/1983 | Japan | 310/358 |
| 0159777 | 7/1986 | Japan | 310/364 |
| 0216493 | 9/1986 | Japan | 310/363 |
| 0248576 | 10/1989 | Japan | 310/363 |
| 0132870 | 5/1990 | Japan | 310/358 |

*Primary Examiner*—Mark O. Budd
*Attorney, Agent, or Firm*—Russell E. Baumann; Richard L. Donaldson; René E. Grossmann

[57] ABSTRACT

A pressure sensor for providing an electrical signal corresponding to pressure in a cylinder of an automotive engine has a rigid load-spreading element rigidly secured to a first surface of a ceramic piezoelectric body by a rigid bonding material precisely conformed to the first surface to be in substantially uniform load-transferring relation to all parts of the first body surface, has a rigid support member rigidly secured to a parallel, opposite surface of the ceramic piezoelectric body by a rigid bonding material precisely conformed to the opposite surface to be in substantially uniform load-transferring relation to all parts of the opposite body surface to form a piezoelectric unit, and has a peripheral part of the rigid support member precisely mounted with an interference fit in a bore in a metal component of a mounting structure so that the body of piezoelectric material and the load-spreading element extend in cantilever relation at a precisely determined location to be engaged by force applied through a diaphragm in response to an applied pressure to provide an electrical signal precisely corresponding to the pressure.

1 Claim, 3 Drawing Sheets

CYLINDER PRESSURE SENSOR FOR AN INTERNAL COMBUSTION ENGINE

This application is a division of application Ser. No. 07/118,374, filed Nov. 9, 1987, now U.S. Pat. No. 5,038,069, issued Aug. 6, 1991.

BACKGROUND OF THE INVENTION

The field of this invention is that of pressure sensors and the invention relates more particularly to a cylinder pressure sensor responsive to variations in pressure within a cylinder of an internal combustion engine to provide electrical signals corresponding to the pressure variations for use in regulating engine operation.

In commonly assigned U.S. Pat. Nos. 4,620,438 and 4,645,965, cylinder pressure sensing devices are shown to comprise a metal body for use in mounting a body of a pressure responsive ceramic piezoelectric material in sealed relation to an engine cylinder to be responsive to variations in cylinder pressure during engine operation to provide initial electrical signals representative of the pressure variations in the cylinder. Metal diaphragms and the like shield the piezoelectric materials from some aspects of the cylinder environments while transmitting pressure forces from the cylinders to the piezoelectric materials for generating the desired pressure responsive signals. In such known devices, electronic means are carried on the metal body for conditioning the initial electrical signals provided by the piezoelectric body for transmission to computer control means or other signal processing means at locations remote from the engine cylinder.

It is recognized that such cylinder pressure sensors will be subjected to applied pressures and operational temperatures which vary over wide ranges. The ceramic piezoelectric materials conventionally considered for use in such pressure sensors display substantial temperature dependence. Those materials are also found to display higher degrees of nonlinearity of response when they are employed at relatively high stress levels. It would be very desireable to provide a cylinder pressure sensor having improved linearity of response at the pressure and temperature levels likely to be encountered so that the initial signals provided by the sensor are more easily and econonmically conditioned for use in performing desired engine control functions and the like.

BRIEF SUMMARY OF THE INVENTION

It is an object of this invention to provide a novel and improved pressure sensor device; to provide such a device which is particularly adapted for use in sensing pressure variations in cylinders of an automotive engine; to provide such a pressure sensor device having improved linearity of response in the environmental and operational conditions likely to be encountered; and to provide such a device which is characterized by reliability and economy of manufacture.

In that regard, it is known that piezoelectric materials display some nonlinearity of response when subjected to applied pressure and it is found that such nonlinearity tends to be greater as the piezoelectric materials are subjected to higher stresses. It is also found that when a body of ceramic piezoelectric material is mounted in conventional manner for receiving applied pressures, there tends to be a substantial degree of non-linearity of load transfer with respect to the piezoelectric body surfaces resulting in high localized stress levels in the piezoelectric materials. As a result, such piezoelectric materials as actually used tend to provide substantial non-linearity of electrical signal response. That is, even at lower applied pressure levels, load transfer to the piezoelectric body surfaces tends to be initially concentrated in three very small areas of each engaged surface. Those force concentrations produce high localized stress levels adjacent those surface areas. When additional pressure is then applied, there tends to be some significant increase in the areas of body surface engagement but still only small portions of the body surfaces tend to be properly engaged. For this reason localized material stresses remain high at the levels where the materials provide poor linearity of response. These undersirable response characteristics due to the stress effects tend to be exacerbated by the temperature dependence of the piezoelectric materials. In addition, the change in area of the engaged surfaces which occurs as applied pressures are varied further masks the desired signal change with pressure. Further, any lack of parallelism between the piezoelectric body surfaces and the support or pressure-applying means engaging those surfaces (whether that lack of parallelism is due to the body surface formation or to mounting of the body relative to the support or pressure applying means) introduces further modification of the desired correlation between changing pressure and output signal.

Briefly described, the novel and improved pressure sensor device of this invention comprises a body of ceramic piezoelectric material having means mounting the body to permit substantially uniform load transfer to all parts of major portions of the piezoelectric body surfaces, thereby to reduce the occurrence of localized high stresses in the piezoelectric material by spreading the applied force over a larger area to provide more linearity of response to the applied pressures. In accordance with the invention, a ridid load-spreading means has one end juxtaposed to a major portion of a first piezoelectric body surface and has that end of the load-spreading means precisely conformed to and rigidly secured to that first body surface by a layer of rigid organic-based bonding material for example, so that the rigid load-spreading means cooperates with the rigid, conformed bonding to be in substantially uniform load-transferring relation to all parts of that first body surface portion. A rigid support means also has one end juxtaposed to a major portion of an opposite surface of the piezoelectric body and has that end of the support means precisely conformed to and rigidly secured to that opposite body surface portion so that it is also in substantial uniform load-transferring relation to all parts of that opposite body surface portion. In that arrangement, the load-spreading means, piezoelectric body, and rigid support means form a piezoelectric unit and in accordance with this invention that unit is fixedly secured to mounting means for precisely mounting the unit to receive an applied pressure for generating an electrical signal precisely corresponding to the pressure with improved linearity of response as the applied pressure is varied. Preferably the support means is mounted with an interference fit in a bore in the mounting means so that the load-spreading means and piezoelectric body extend in cantilever relation from the location of the interference fit for precisely locating an opposite end of the load-spreading means to receive an applied pressure force thereon. In that way the novel and improved pressure sensor device of this invention achieves more precise and substantially more linear response to applied pressure as those pressures are varied over a wide range. Selected contact means, bonding means, heat-dissipating means, diaphragm means, and ceramic piezoelectric body configurations and compositions are also provided for further improving performance of the novel piezoelectric unit mounting structure of the invention.

DESCRIPTION OF THE DRAWINGS

Other objects, advantages and details of the novel and improved pressure sensor device of this invention appear in the following detailed description of preferred embodiments of the invention, the detailed description referring to the drawings in which:

FIG. 5 is a section view along an axis of a component used in another alternate embodiment of this invention; and.

DESCRIPTION OF THE PREFERRED EMBODIMENTS

Figures 1, 2:
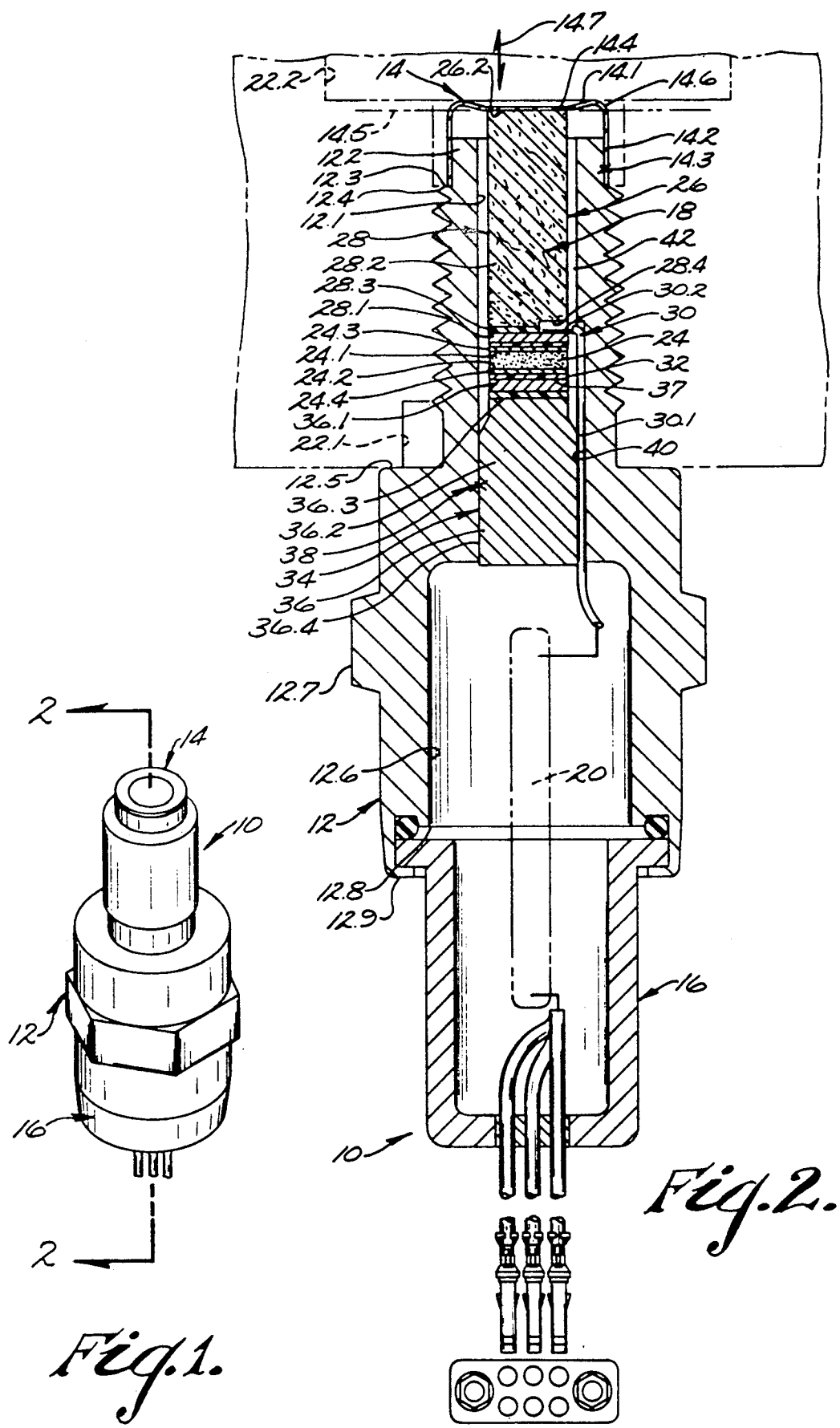
FIG. 1 is a perspective view of a pressure sensor device of this invention.
FIG. 2 is a section view to enlarged scale of along line 2—2 of FIG. 1.
Figure 3:
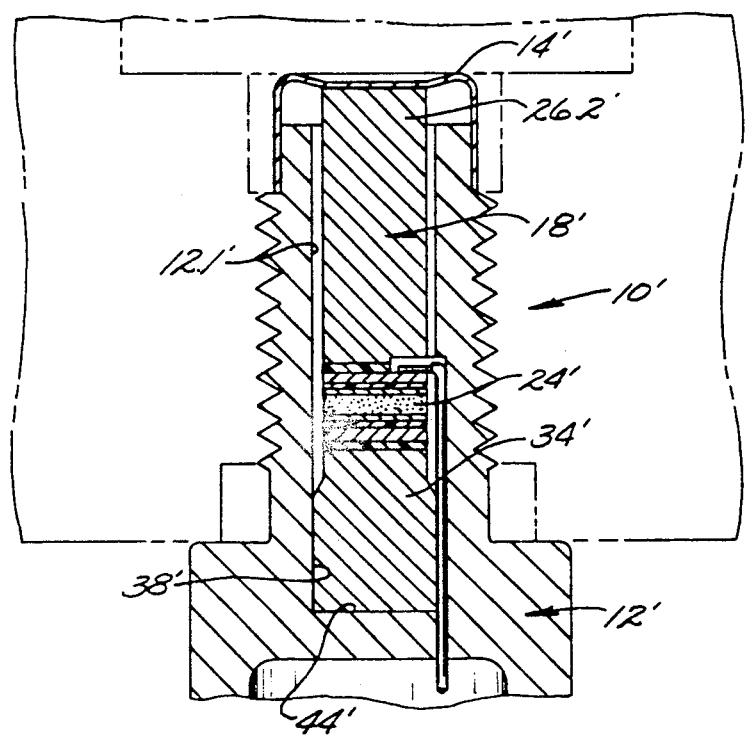
FIG. 3 is a partial section view similar to FIG. 2 illustrating an alternate embodiment of this invention.

Referring to the drawings, 10 in FIGS. 1-3 indicates a preferred embodiment of the novel and improved pressure sensor device of this invention which is shown to include mounting means 12, diaphragm means 14 at one end of the mounting means, and terminal means 16 at the opposite and of the mounting means for connecting the device in an electrical control circuit for the like. In accordance with the invention, a piezoelectric sensing unit 18 as shown in FIG. 2 is fixedly secured to the mounting means to be responsive to an applied pressure for providing an initial electrical signal corresponding to the pressure, and signal conditioning means 20 are preferably incorporated in the device for processing the initial electrical signals for transmission to a location remote from the sensor device. Preferably the device has a general size and configuration similar to a small automotive spark plug.

The mounting means preferably comprises a rigid metal component formed of cold rolled steel or the like having a central bore 12.1, having one end 12.2 of reduced diameter forming a shoulder 12.3 adjacent that component end, and having external screw threads 12.4 near that component end for threadedly attaching the mounting component in sealed relation within a well 22.1 on an internal combustion engine 22 (indicated in broken lines in FIG. 2) to face said one end of the component toward the engine and present it to the pressure environment within a piston cylinder 22.2 of the engine. Alternately the component is adapted for mounting the piezoelectric unit to be exposed to pressure forces in any other pressure zone to be monitored. The mounting component preferably provides a mounting shoulder 12.5 for limiting insertion of the device into the engine well 22.1, a chamber 12.6 at an opposite end of the mounting component communicating with the bore 12.1 for housing signal conditioning means 20 or the like, having hexagonal gripping means 12.7 for use in threadedly mounting the component, having a shoulder 12.8 provided at the opposite component end for mounting the terminal means 16 thereon, and having a rolled flange 12.9 at the opposite end for attaching the terminal means to the component in a convenient manner.

The diaphragm means 14 preferably comprises a generally cup-shaped metal member having a bottom 14.1 and a side wall 14.2 which is preferably attached to the metal mounting component 12 by welding or the like as indicated at 14.3, preferably forming a seal entirely around the rim for sealing one end of the bore 12.1. Preferably the cup rim is abutted against the mounting components shoulder 12.3 to facilitate attachment to the mounting component and to cooperate with the welding in precisely locating the diaphragm on the metal component. In a preferred embodiment, the central portion 14.4 of the diaphragm means has a relatively large flat area normally disposed in a plane indicated in FIG. 2 by line 14.5, and the material of the diaphragm is preferably a thin durable material such as Inconel or stainless steel or the like adapted to have substantial pliability so that the flat central portion of the diaphragm is adapted to be readily movable relative to the side wall 14.2 at the radius 14.6 in the direction indicated by the arrow 14.7 in FIG. 2 in response to variation in applied fluid pressures existing in the engine cylinder 22.2 during engine operation as will be understood while continuing to engage the piezoelectric sensing element 18 as described below.

The piezoelectric unit 18 includes a disc or body 24 of polycrystalline ceramic piezoelectric material having the first, preferably flat, surface 24.1 at one end of the body for receiving an applied pressure force and in opposite, preferably flat and parallel, surface 24.2 for supporting the body so the applied pressure force compresses the piezoelectric material between the body surfaces to generate an electrical signal corresponding to the force. Preferably the body surfaces 24.1, 24.2 are provided with a degree of flatness and parallelism which is consistent with economic manufacture, and thin electrical conductive contacts 24.3, 24.4 are provided on the respective body surfaces by use of metal inks or the like in conventional manner to precisely conform to the ceramic body materials and provide ohmic contact to the ceramic body material. In accordance with this invention any conventional ceramic piezoelectric materials are utilized in the body 24 within the scope of this invention but in a preferred embodiment the ceramic piezoelectric material preferably comprises a lead-strontium-zirconium, iron-titanate material having an empirical formula of

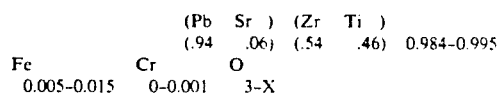

wherein X represents a slight variation of the oxygen constituent.

Conventional piezoelectric materials having similar lead, strontium, titanium and iron constituents are believed to be known and such materials with iron contents of 0.5 molar percent or less have been available commercially but the present composition with the noted higher iron content is preferred for the high pressure cylinder pressure application because it has a relatively much harder piezoelectric characteristic to provide improved linearity of response over the higher pressure ranges, the chromium constituent provides improved resistivity at the lower end of the iron content range and also improves the dissipation factor of the material.

The piezoelectric unit 18 further includes a rigid load-spreading means 26 having one end which is juxtaposed to the contact 24.3 over a major portion of the first piezoelectric body surface 24.1 and which is precisely conformed to and rigidly secured to that contacted surface to be in substantially uniform load-transferring relation to all parts of that first body surface portion. Preferably for example a rigid load-spreading element 28 comprises a metal disc 28.1, a rigid ceramic force transfer member 28.2, and a rigid bonding layer 28.3 rigidly securing the disc and transfer member together to form the load-transfer element 28. Preferably the disc 28.1 has sufficient thickness to be independently rigid and is formed of an electrically conductive metal material of relatively low coefficient of thermal expansion generally corresponding to that of the piezoelectric body 24. Preferably for example the disc 28.1 is formed of a material sold under the designation Kovar (nickel 23-30%, cobalt 30-17%, manganese 0.6-0.8%, and the balance iron) or Invar (36% nickel, and the balance iron) or the like having thermal coefficients of expansion on the order of $6.5 \times 10^{-6}$ in./in./degrees F. or less. Preferably the ceramic transfer member 28.2 is of a generally cylindrical configuration and is formed of steatite or zirconium oxide or the like. Preferably, one end of the transfer member has a narrow groove 28.4 in a peripheral part thereof and that end of the transfer member is rigidly secured to one side of the disc 28.1 by a rigid bonding material 28.3 such as an epoxy or the like. Preferably an electrical lead 30 having insulation 30.1 thereon intermediate its ends has one end 30.2 secured in electrically conductive relation to the disc 28.1 at the location of the groove 28.4 as shown in FIG. 2. An opposite end of the disc 28.1 is rigidly secured to the juxtaposed contacted first surface 24.1 of the piezoelectric body by a rigid layer 32 of an electrically conducting bonding material such as a metal-filled epoxy, a filled polyimide or other known rigid bonding material which is cured in situ between the load-spreading element 28 and the contacted surface portion 24.1 of the piezoelectric body to be precisely conformed and rigidly secured to that contacted body surface. In one preferred embodiment an epoxy bonding material with a metal particle filler also includes glass balls or rods which serve to precisely space the metal disc 28.1 from the body 24. Preferably good bond retention during thermal cycling with good rigidity, the bonding material is selected to have a glass transition point within the temperature range of intended use.

The piezoelectric unit 18 further includes a rigid support means 34 having one end which is juxtaposed to the contact 24.4 over a major portion of the opposite piezoelectric body surface 24.2 and which is precisely conformed to and rigidly secured to that contacted surface 24.2 to be in substantially uniform load-transferring relation to all parts of that opposite body surface portion. Preferably for example a rigid support member 36 comprises a metal disc 36.1, a rigid metal support member 36.2 and an electrically conductive rigid bonding means indicated at 36.3 for securing the disc and member together to form the rigid support member 36.

Preferably the disc 36.1 has sufficient thickness to be independently rigid and is formed of a metal such as the disc 28.1 described above. In that way, the discs 36.1 and 28.1 serve to provide improved thermal coefficient of expansion matching between the ceramic body 24 and other components of the unit 18. Preferably the metal support member 36.2 is formed of a steel material corresponding to the metal mounting component 12 and has a portion 36.4 of selected diameter relatively larger than the disc 36.1 and relatively larger than the piezoelectric body 24 and the load-transfer element 28 for a reason to be further described below. The bonding means 36.3 comprises an electrically conductive bonding material such as a bonding material 32 described above, but the bonding means 36.3 can also comprise a weld or braze or the like between the disc 36.1 and member 36.2 within the scope of this invention. The rigid support member 36 has one side of the disc 36.1 rigidly secured to the juxtaposed contacted surface 24.2 of the piezoelectric body by use of a rigid electrically conductive bonding material 37 corresponding to the bonding material 32 previously described.

It should be understood that although the rigid bonding layers 32 and 34 are described above as comprising organic-based electrically conductive materials or the like, those layers are also adapted to be formed of metal bonding means such as solders or brazes and the like within the scope of this invention. In one preferred embodiment for example, the bonding layers are formed of a rigid but malleable metal material and the piezoelectric unit 18 is compressed between the opposite ends thereof under one applied pressure level for deforming the malleable metal bonding material to precisely conform it and rigidly secure it to the surfaces of the piezoelectric body, thereby to be very rigidly secured to those surfaces during subsequent use of the piezoelectric sensing unit at relatively lower applied pressures.

In accordance with this invention, the piezoelectric unit 18 is fixedly mounted on the metal component 12 to dispose the opposite end 26.2 of the load-spreading means at a precisely determined location for receiving an applied pressure force and for uniformly applying that force to the piezoelectric body surfaces to provide a pressure sensing device with more precise and more linear response to variation in applied pressures. In a preferred embodiment as shown in FIG. 2, the piezoelectric unit 18 is inserted into the metal component bore 12.1, the diameter 36.3 of the support member being selected to be fixedly mounted in the bore by an interference fit of that peripheral portion of the support member at a selected location in the bore as indicated at 38 in FIG. 2. Preferably the peripheral portion 36.3 of the support member is provided to facilitate forming an interference fit. That is, the unit 18 is mounted with an interference fit at the selected location 38 so that the load-spreading means 26 and the piezoelectric body 24 extend in cantilever relation from the support within the bore and preferably engage the opposite end 26.2 of the load-spreading means with the diaphragm 14 to establish a selected preload pressure force on the piezoelectric body 24. The lead 30 is extended through the bore 12.1 through a groove 40 provided in the mounting component bore to extend the lead into the chamber 12.6. In that arrangement, the rigid support member is secured in good electrical engagement with the component 12 at location 38 for electrically connecting one side of the piezoelectric body 24 in an electrical circuit and the opposite side of the body is easily connected in that circuit by the lead 30. If desired the piezoelectric unit is welded to the metal mounting component 12 at the locations 38 of the interference fit for locking-in the desired preload as indicated at 41 in FIG. 2. Signal conditioning means 20 are easily connected to the lead 30 and/or to the component 12 and to the terminal means 16 within the chamber 12.6 in any conventional manner as will be understood. The piezoelectric unit is adapted to be easily and precisely manufactured, and subjected to testing or the like if desired prior to mounting in a component 12, and is then easily and accurately mounted in the component 12 with assurance that it is precisely located to provide accurate electrical signal response to applied pressures received by the diaphram 14. In this way, variations in device response through the proper mounting of the piezoelectric body are substantially reduced so that the linearity of response of the piezoelectric body material to applied pressures substantially corresponds to the limits of linearity of response provided by the nature of the selected piezoelectric material itself. In this arrangement improvement in device response due to the noted improvement in mounting factors is so substantial, it is found desirable to utilize a preferred lead-strontium-zirconium-iron-titanate piezoelectric material as described above, that novel and improved piezoelectric material being characterized by an improved linearity of signal response during temperature variation over a wide range from room temperature up to 200 degrees C. or more. That is, this composition is especially adapted by increased iron content above about 0.5 percent for use with piezoelectric units 18 as described for providing improved overall linearity of device response under variable pressure and temperature conditions. As thus described, the piezoelectric unit 18 has a selected space as indicated at 42 in FIG. 2 between the walls of the bore 12.1 and the load-spreading means 26 and piezoelectric body 24. In a preferred embodiment, that space is filled with a thermally conducting, electrically insulating material such as a silicone grease or the like which is freely conformable to the shape of the space so it does not restrict proper response of the piezoelectric unit 18 to applied pressure forces but does tend to withdraw heat from the load-spreading means 26 and the body 24 and to dissipate that heat through the threads 12.4 or the metal component to the engine 22 for example, thereby to reduce the temperature range extremes to which the piezoelectric body 24 is exposed.

In an alternate embodiment of the invention as shown in FIG. 3 wherein corresponding reference numerals identify corresponding components, the metal component 12' has a bore 12.1' formed with a bottom 44 therein and the piezoelectric unit 18' is inserted into that bore with an interference fit therein at 38'. In a preferred embodiment, the support means 34' in the piezoelectric unit 18' is abutted against the bore bottom and the diaphragm 14' is pressed against the opposite end 26.2' of the load-spreading means to establish a desired preload compression force on the piezoelectric body 24' before the diaphragm is welded to the component 12'.

Figure 4:
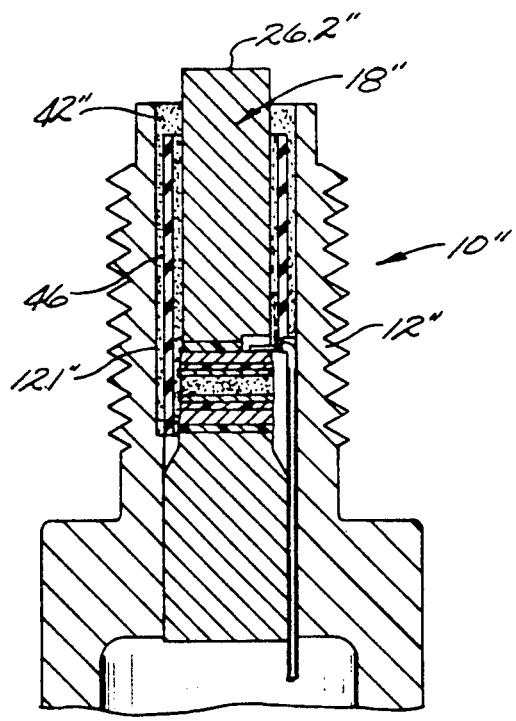
FIG. 4 is a partial seciton view similar to FIG. 2 illustrating another alternate embodiment of the invention.

In another alternate embodiment of the invention as shown in FIG. 4, the diaphragm means are omitted so that the opposite end 26.2" of the piezoelectric unit 18" is adapted to directly receive applied pressure forces thereon. Such a device is adapted for the same use or for use for non-automotive and/or lower pressure or temperature applications. In that device, the thermally conducting, electrically insulating materials such as silicone grease 42" is freely conformable to the shape of the bore 12.1" but has sufficient shape retaining capability to be adapted to be retained within the bore. In that arrangement, a thin tubular element 46 of electrical insulating material is preferably fitted over the unit 18" to be retained in the bore by the grease or other heat-dissipating material while assuring that the cantilever portion of the unit 18" is not grounded to the component 12" material.

Figure 5:
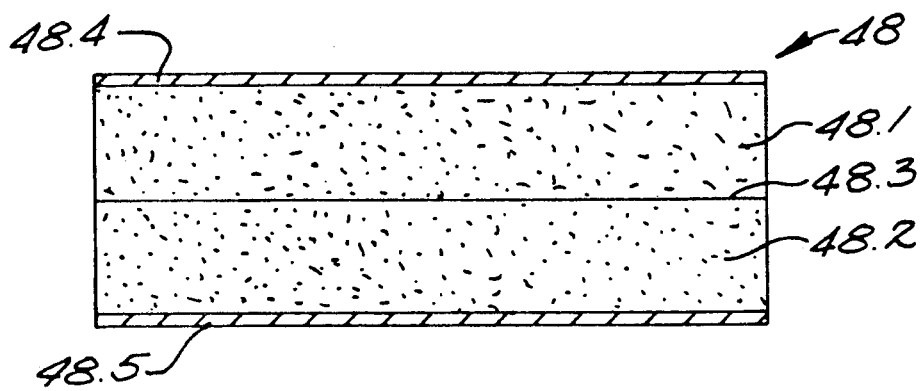

In another alternate embodiment of the invention as shown in FIG. 5, a piezoelectric body 48 is formed as a composite ceramic piezoelectric body having one layer portion 48.1 formed of one piezoelectric material such as a lead zirconium titanate having a selected combination or ratio of performance characteristics such as linearity of response and material resistivity for example. A second layer portion 48.2 is formed of another piezoelectric material such as the lead-strontium-zirconium-iron-titanate previously described. In that arrangement, at least one body layer is preferably formed in situ on the other layer to be precisely conformed to the other layer along the interface 48.3 between the layers. Electrical contacts 48.4, 48.5 are provided in ohmic contact relation to opposite sides of the body. In that arrangement the body layers are adapted to cooperate in providing a composite body with a combination of performance characteristics such as resistivity and linearity of response which are novel and advantageous for specific applications, the body 48 being adapted to be substituted for the body 24 previously described.

Figure 6:
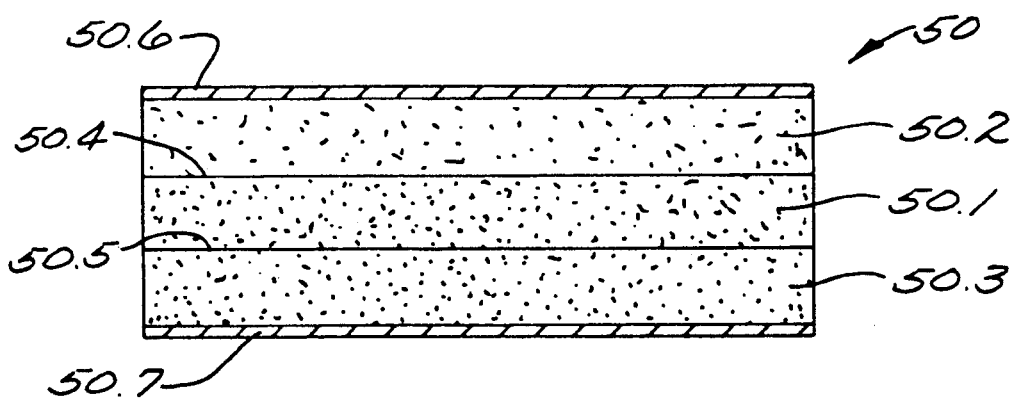
FIG. 6 is a section view along an axis of another component used in another alternate embodiment of this invention.

In another alternate embodiment as shown in FIG. 6, another piezoelectric body 50 is formed as a composite ceramic piezoelectric body having a core layer 50.1 of a ceramic piezoelectric material such as the lead-strontium-zirconium-iron-titanate as previously described. Other layers 50.2 and 50.3 of other ceramic materials which are preferably electrically conductive but do not display piezoelectric effects are provided on opposite sides of the core layers to serve as rigid load-spreading means and rigid support means respectively. That is, such outer ceramic layers 50.2 and 50.3 are preferably formed in situ on the core layer 50.1 so that they are precisely conformed to and rigidly secured to opposite surfaces 50.4, 50.5 of the core layer to be in substantially uniform load-transferring relation to the core layer surfaces. Preferably metal contacts 50.6, 50.7 are provided in ohmic contact to the electrically conductive support and load-spreading means. In that arrangement, the body 50 is adapted to be substituted for the piezoelectric units such as the unit 18 as previously described and to be fixedly secured in a metal component 12 or the like by adhesive means or the like.

It should be understood that although particular embodiments of this invention have been described by way of illustrating the invention, this invention includes all modifications and equivalents of the disclosed embodiments falling within the scope of the impended claims.

We claim:

1. A piezoelectric unit for use in a pressure responsive device to provide an electrical signal in response to an applied pressure comprising a core layer of ceramic piezoelectric material having first and opposite surfaces thereon, rigid load-spreading layer of electrically conductive ceramic material formed in situ on the first surface of said core layer precisely conformed to and rigidly secured in substantially uniform load-transferring relation to said first surface of the core layer, and a rigid support layer of electrically conductive ceramic material formed in situ on the opposite surface of said core layer precisely conformed to and rigidly secured in substantially uniform load-transferring relation to said opposite surface of the core layer.

* * * * *